United States Patent
Nakanishi et al.

(10) Patent No.: US 8,491,776 B2
(45) Date of Patent: Jul. 23, 2013

(54) FLOW CELL, APPARATUS FOR CONCENTRATING RADIOACTIVE FLUORIDE ANION, AND METHOD OF CONCENTRATING RADIOACTIVE FLUORIDE ANION

(75) Inventors: Hiroaki Nakanishi, Kyoto (JP); Satoshi Konishi, Kusatsu (JP); Keisuke Naka, Kusatsu (JP)

(73) Assignees: Shimadzu Corporation, Kyoto (JP); The Ritsumeikan Trust, Kyoto (JP)

( * ) Notice: Subject to any disclaimer, the term of this patent is extended or adjusted under 35 U.S.C. 154(b) by 433 days.

(21) Appl. No.: 12/674,001

(22) PCT Filed: Aug. 31, 2007

(86) PCT No.: PCT/JP2007/067018
§ 371 (c)(1),
(2), (4) Date: Apr. 22, 2010

(87) PCT Pub. No.: WO2009/028093
PCT Pub. Date: Mar. 5, 2009

(65) Prior Publication Data
US 2011/0100840 A1    May 5, 2011

(51) Int. Cl.
*G01N 30/00* (2006.01)
*G01N 30/26* (2006.01)
*G01N 30/88* (2006.01)

(52) U.S. Cl.
USPC ......... 205/760; 204/157.2; 204/665; 205/742

(58) Field of Classification Search
USPC ................. 204/157.2, 665; 205/687
See application file for complete search history.

(56) References Cited

U.S. PATENT DOCUMENTS

| 5,770,030 A * | 6/1998 | Hamacher et al. ............... 205/43 |
| 6,462,935 B1 * | 10/2002 | Shiue et al. .................... 361/511 |
| 6,783,647 B2 * | 8/2004 | Culbertson et al. ........... 204/453 |
| 6,818,105 B2 * | 11/2004 | Tojo et al. ...................... 204/240 |
| 7,964,530 B2 * | 6/2011 | Nanba et al. .................. 502/416 |

FOREIGN PATENT DOCUMENTS

| JP | 9-507162 A | 7/1997 |
| JP | 2005-519270 A | 6/2005 |
| JP | 2007-516332 A | 6/2007 |
| WO | WO-95/18668 A1 | 7/1995 |
| WO | WO-03/073437 A1 | 9/2003 |
| WO | WO-2005/061110 A1 | 7/2005 |

OTHER PUBLICATIONS

International Search Report for the Application No. PCT/JP2007/067018 mailed Nov. 20, 2007.

(Continued)

*Primary Examiner* — Keith Hendricks
*Assistant Examiner* — Salil Jain
(74) *Attorney, Agent, or Firm* — Cheng Law Group, PLLC

(57) ABSTRACT

A flowcell 2 is constituted of insulating substrates 2a and 2b. The two substrates 2a and 2b have been directly bonded to each other by a bonding method for attaining tenacious bonding, for example, anodic bonding or hydrofluoric acid bonding. A channel 6 has been formed at the interface between the substrates 2a and 2b. Part of the substrate 2a which faces the channel 6 has a carbon electrode 4a formed thereon by sintering a pasty carbon material, the electrode 4a extending along the channel 6. On the other hand, the substrate 2b has a groove 6a serving as the channel 6, and has an electrode 4b made of a metal film formed on a bottom surface of the groove 6a.

6 Claims, 4 Drawing Sheets

OTHER PUBLICATIONS

Alexoff, David et al., "Recovery of [$^{18}$F]Fluoride from [$^{18}$O]Water in an Electrochemical Cell", Applied Radiation and Isotopes, 1989, vol. 40, No. 1, pp. 1-6.

Hamacher, K. et al., "No-Carrier-Added Nucleophilic $^{18}$F-Labelling in an Electrochemical Cell Exemplified by the Routine Production of [$^{18}$F]Altanserin", Applied Radiation and Isotopes. 2006, vol. 64, pp. 989-994.

* cited by examiner

FLOW CELL, APPARATUS FOR CONCENTRATING RADIOACTIVE FLUORIDE ANION, AND METHOD OF CONCENTRATING RADIOACTIVE FLUORIDE ANION

TECHNICAL FIELD

The present invention relates to a technical field in which an $^{18}F^-$ ion obtained by radiating a proton accelerated by a cyclotron to $[^{18}O]$—$H_2O$ water is separated from the $[^{18}O]$—$H_2O$ water so as to produce an organic solvent solution of the $^{18}F^-$ ion, and in particular to a flowcell used for that purpose, a radioactive fluoride anion concentrating apparatus provided with the flowcell, and a radioactive fluoride anion concentrating method using the apparatus.

BACKGROUND ART

Among the medical diagnosis methods using radioactive tracer compounds, many of the radioactive nuclides used in a PET (Positron Emission Tomography) diagnosis have a short half-life and, for example, the half-life of an $^{18}F^-$ ion is about 110 minutes. In order to introduce these radioactive nuclides efficiently into tracer compounds to make the compounds radioactive, a time-saving work will be needed.

Also, since $[^{18}O]$—$H_2O$ water serving as a source material of the $^{18}F^-$ ion is expensive, reuse of the $[^{18}O]$—$H_2O$ water is desired in order to attain cost-down of the PET diagnosis.

Because of the short life of the radioactive nuclides that are put to use, the period of time that can be used for the PET or the like is limited and, for the synthesis of compounds labeled with reduction of time in terms of minutes and a high synthesis rate are simultaneously demanded.

Two methods can be mentioned as a method for producing an organic solvent solution of an $^{18}F^-$ ion by separating the $^{18}F^-$ ion from $[^{18}O]$—$H_2O$ water.

One of the two methods is a method of passing $[^{18}O]$—$H_2O$ water containing the $^{18}F^-$ ion through a column filled with an anion-exchange resin and allowing the $^{18}F^-$ ion to be trapped onto the resin so as to separate the $[^{18}O]$—$H_2O$ water (conventional method 1). With use of an aqueous solution of potassium carbonate, the trapped $^{18}F^-$ ion is reeluted into the aqueous solution to be collected. The collected aqueous solution is subjected to vacuum concentration and, after water is completely removed, the $^{18}F^-$ ion is dissolved in an organic solvent that is used in an organic reaction, so as to obtain an organic solvent solution of the $^{18}F^-$ ion. The concentration of the $^{18}F^-$ ion can be adjusted by the amount of the organic solvent added during this process.

The other one is a method of trapping the $^{18}F^-$ ion onto a glassy carbon rod-shaped electrode and performing solvent exchange from the $[^{18}O]$—$H_2O$ water to an organic solvent (conventional method 2). The $[^{18}O]$—$H_2O$ water from which $^{18}F^-$ has been separated by this method can be expected to be capable of being reused because of not containing eluted organic substances. An apparatus for separating an ion from an $[^{18}O]$—$H_2O$ aqueous solution is reported in Patent Document 1 and Non-patent Documents 1 and 2.

A basis structure of this apparatus is described in detail in Non-patent Document 1. By using a cell having a glassy carbon rod-shaped electrode and a platinum electrode and applying a voltage with the glassy carbon rod-shaped electrode serving as a positive electrode, the $^{18}F^-$ ion is deposited onto the electrode, so as to separate the $^{18}F^-$ ion from the $[^{18}O]$—$H_2O$ water. Then, the $^{18}F^-$ ion deposited onto the positive electrode is collected into an organic solvent (dimethyl sulfoxide (DMSO)) by switching the glassy carbon rod-shaped electrode to a negative electrode, and the collected $^{18}F^-$ ion is supplied to a reaction of the $^{18}F^-$ ion with an organic compound.

Here, Non-patent Document 2 for the first time has reported a technique of depositing an $^{18}F^-$ ion onto a graphite-form carbon electrode with regard to a combination of a graphite-form carbon electrode and a platinum electrode.

Patent Document 1: Japanese Published Patent Publication No. 2005-519270
Non-patent Document 1: Appl. Radiat. Isot. 2006 (64) 989-994.
Non-patent Document 2: Appl. Radiat. Isot. 1989 (40) 1-6.

DISCLOSURE OF THE INVENTION

Problems to be Solved by the Invention

In the case of the conventional method 1, although the separation of the $^{18}F^-$ ion from the $[^{18}O]$—$H_2O$ water by the ion-exchange resin can be carried out rapidly, there will be a lot of work until the $^{18}F^-$ ion collected from the ion-exchange resin is dissolved in an organic solvent, so that the period of time needed will be long. Also, since there will be a lot of work, the kind and the amount of apparatus and reagents that are put to use will increase. Also, the $[^{18}O]$—$H_2O$ water separated at this time cannot be reused because a slight amount of organic substances are eluted from the ion-exchange resin.

In the case of the conventional method 2, the cell used in the aforementioned documents is a cell for batch processing, so that the $^{18}F^-$ ion cannot be trapped to the glassy carbon rod-shaped electrode while allowing the $[^{18}O]$—$H_2O$ water to flow. Therefore, the amount of $[^{18}O]$—$H_2O$ water that can be processed at one time is as small as the amount that can be introduced into the cell. Also, when a voltage applied to the glassy carbon rod-shaped electrode is set to be about 20 V in trapping the $^{18}F^-$ ion onto the cell, the period of time for trapping will be about 8 minutes. Also, the period of time for collecting the solution containing the $^{18}F^-$ ion from the glassy carbon rod-shaped electrode will be about 5 minutes.

Further, the volume of the obtained organic solvent solution of the $^{18}F^-$ ion can be concentrated only into about one several-th relative to the volume of the $[^{18}O]$—$H_2O$ water containing the $^{18}F^-$ ion, so that the concentration rate is not so high.

Therefore, an object of the present invention is to provide a flowcell that can trap an $^{18}F^-$ ion while allowing an $[^{18}O]$—$H_2O$ aqueous solution containing the $^{18}F^-$ ion to flow and can enhance the concentration rate thereof by collecting the $^{18}F^-$ ion with use of a slight amount of an $^{18}F^-$ ion collecting agent, as well as a radioactive fluoride anion concentrating apparatus using the flowcell and a method using the same.

Means for Solving the Problems

A flowcell of the present invention comprises a cell main body in which a pair of insulating substrates are directly bonded to each other to form a channel in the inside thereof, and a pair of electrodes that are disposed in parallel with each other so as to oppose each other in the channel and firmly fixed onto each of the substrates, with at least one of the electrodes being a carbon electrode made of a pyropolymer.

A "pyropolymer" is a carbon material derived from a polymer, and is made by sintering a pasty carbon material. A "pasty carbon material" is a material containing carbon as a major component, and is a material that can be arbitrarily patterned by being applied onto a surface of a base material. The carbon material such as this may be, for example, a polymer material such as a photoresist, a polyimide, or parylene.

The interval between the pair of electrodes is preferably 500 μm or less. When the distance between the electrodes incorporated into the flowcell is set to be 500 μm or less, the electric potential gradient between the electrodes will be large even with a low applied voltage, so that the influence acting on the $^{18}F^-$ ion will be large. Also, by setting the volume of the channel incorporated into the flowcell to be a space of several hundred μL or less, the specific surface area of the carbon electrode relative to the channel volume will be large. Accordingly, a larger amount of $[^{18}O]$—$H_2O$ water containing an $^{18}F^-$ ion can be processed with a low voltage in a period of time shorter than that by a conventional method. Also, the volume of an organic solvent solution (which may also be referred to as an $^{18}F^-$ ion collecting agent) for collecting the trapped $^{18}F^-$ ion can be reduced, so that the concentration rate will be improved.

In a specific structure of the flowcell, the channel is formed by a flat surface of one substrate of the pair of insulating substrates and a groove formed in the other substrate. The carbon electrode is formed on the flat surface, and the electrode opposed to the carbon electrode is formed within the groove.

The electrode opposed to the carbon electrode may be, for example, a metal electrode having a flat and smooth surface. In that case, the metal electrode may be made from platinum, gold, aluminum, tungsten, copper, silver, conductor silicon, titanium, chromium, or the like.

The substrate on which the carbon electrode is formed may be a transparent substrate. In that case, the carbon electrode preferably has an aperture ratio such that the inside of the channel can be observed by eye inspection. A specific example thereof may be one in which the carbon electrode is formed in a lattice shape.

When the carbon electrode has an aperture ratio of such a degree that the inside of the channel can be observed by eye inspection from the back surface side of the transparent substrate as in a case in which the carbon electrode is formed in a lattice shape, generation of air bubbles or the like can be found out quickly so as to cope with the problem while the appearance of the inside of the flowcell is being observed by eye inspection from the outside of the flowcell during the work of trapping and collecting the $^{18}F^-$ ion.

The present method of producing a flowcell comprises the steps of: forming a pasty material layer containing carbon on a surface of a flat insulating substrate having heat resistance and, after the layer is patterned into an electrode shape, performing a sintering process in a non-oxidizing atmosphere to form a carbon electrode made of a pyropolymer; forming a groove in a surface of another insulating substrate and forming a metal electrode having a flat and smooth surface on a bottom surface of the groove; and allowing the two sheets of substrates to oppose each other and directly bonding the substrates with each other so that a channel may be formed by the groove and so that the carbon electrode and the metal electrode may oppose each other within the channel.

By this production method, the carbon electrode can be patterned into an arbitrary shape. Therefore, even if the channel is made complex, the shape of the carbon electrode can be made to meet the channel shape, whereby the flowcell can be made to have multiple functions. Also, by this method, the flowcell is constructed by directly bonding two sheets of substrates, so that a channel having high liquid-tightness can be formed in the inside of the flowcell. When the liquid-tightness of the channel improves, even a slight amount of a liquid can be treated as well. As a result of this, when the flowcell formed by this method is used as a flowcell for trapping and collecting an $^{18}F^-$ ion, the $^{18}F^-$ ion can be collected with a slight amount of an $^{18}F^-$ ion collecting liquid after the $^{18}F^-$ ion is trapped by the carbon electrode, whereby the concentration rate of the $^{18}F^-$ ion can be increased.

The present radioactive fluoride anion concentrating apparatus comprises: the present flowcell; a power supply that can apply a direct-current voltage between the pair of electrodes of the flowcell and can convert the polarity thereof; and liquid feeding means for feeding an $[^{18}O]$—$H_2O$ aqueous solution containing an $^{18}F^-$ ion to the channel of the flowcell.

The present radioactive fluoride anion concentrating method uses the present radioactive fluoride anion concentrating apparatus, and comprises, in the following order: a trapping step of applying a voltage by the power supply with a positive electrode being one electrode that is the carbon electrode, allowing the $[^{18}O]$—$H_2O$ aqueous solution containing the $^{18}F^-$ ion to flow within the channel so as to trap the $^{18}F^-$ ion onto the carbon electrode; and a collecting step of applying a voltage with a negative electrode being the one electrode by inverting the polarity of the power supply, allowing an $^{18}F^-$ ion collecting agent to flow within the channel so as to collect the $^{18}F^-$ ion into the $^{18}F^-$ ion collecting agent. The $^{18}F^-$ ion collecting agent may be, for example, a solution containing water, an organic solvent or an organic reaction substrate, and Kryptofix 222 (registered trade mark; product of Merck Co., Ltd.).

Effects of the Invention

The flowcell of the present invention includes a pair of electrodes, at least one of which is a carbon electrode made of a pyropolymer in the inside of a channel formed within a cell main body, and therefore can be used as a flowcell for trapping and collecting an $^{18}F^-$ ion while a solution containing the $^{18}F^-$ ion is being let to flow.

In this flowcell, since the pair of electrodes are firmly fixed to each of the substrates within the channel, the pair of substrates constituting this flowcell can be directly bonded to each other, so that the liquid-tightness within the channel is high, and a slight amount of a liquid can be treated. Therefore, the $^{18}F^-$ ion can be collected with a slight amount of an ion collecting liquid after the $^{18}F^-$ ion is trapped by the carbon electrode, whereby a high concentration rate of the $^{18}F^-$ ion can be obtained.

Since the carbon electrode is constituted of a pyropolymer, the shape of the carbon electrode can be arbitrarily patterned, so that the flowcell can be made to have multiple functions by making the channel shape complex.

Figure 1:
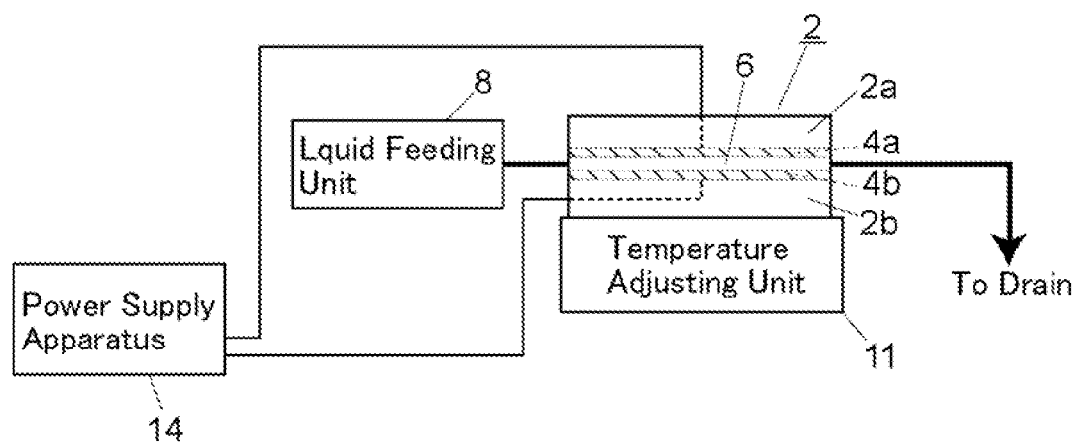
FIG. 1 is a schematic construction view illustrating one example of a radioactive fluoride anion concentrating apparatus.

DESCRIPTION OF THE SYMBOLS 2, 22 flowcell
2a, 12a, 22 a substrate (carbon electrode side)
2b, 22b substrate (metal electrode side)
4a, 17a, 24a carbon electrode
4b, 24b metal electrode
6 channel
6a, 26 a groove
7a, 27a liquid introducing inlet
7b, 27b liquid discharging outlet
8 liquid feeding unit
14 temperature adjusting unit
14 power supply apparatus
15a, 15b, 28a, 28b electrode-leading through-hole
16a, 16b, 30a, 30b leading wire

BEST MODES FOR CARRYING OUT THE INVENTION

FIG. 1 is a schematic construction view illustrating, one example of a radioactive fluoride anion concentrating apparatus.

A flowcell 2 is constructed by bonding two sheets of insulating substrates 2a and 2b, and a channel 6 is formed in the inside thereof. The flowcell 2 is provided with a pair of electrodes 4a and 4b that are disposed in parallel to oppose each other within the channel 6. The electrodes 4a and 4b are firmly fixed to the substrates 2a and 2h, respectively, The flowcell 2 is mourned on a temperature adjusting unit 11. One end of the channel 6 is a liquid introducing inlet that is connected to a liquid feeding unit 8 constructed, for example, of a syringe pump. The other end of the channel 6 is a drain for discharging the liquid that has flowed through the channel 6 to the outside of the flowcell 2.

The liquid feeding unit 8 is adapted to be capable of suitably switching the liquid to be supplied or to be capable of being converted to liquid feeding units for respective liquids, so as to feed an [$^{18}O$]—$H_2O$ aqueous solution containing an $^{18}F^-$ ion in a step of trapping the $^{18}F^-$ ion and to feed a liquid for collecting the $^{18}F^-$ ion in a step of collecting the trapped $^{18}F^-$ ion.

A power supply apparatus 14 is electrically connected to the electrodes 4a and 4b, so as to be capable of applying a voltage between the electrodes 4a and 4b, and to be capable of inverting the polarity of the voltage to be applied between the two electrodes 4a and 4b.

Figure 2A:
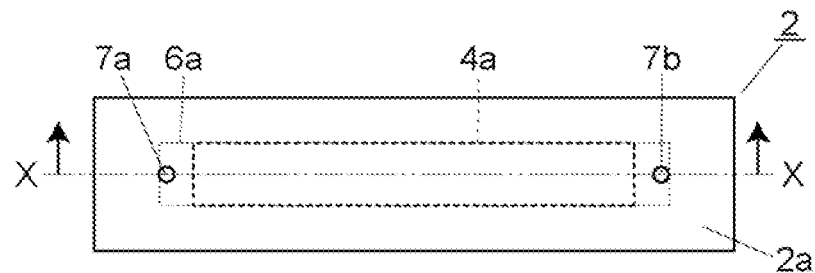
FIG. 2A is a plan view illustrating one example of a flowcell.
Figure 2B:
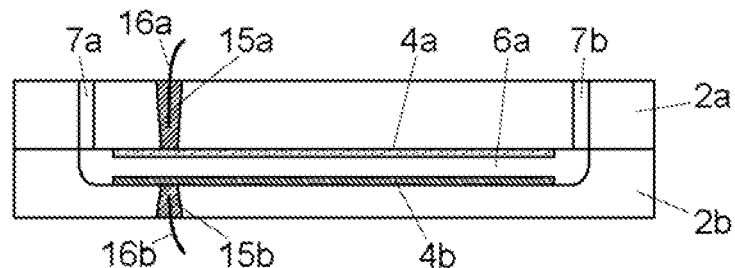
FIG. 2B is a cross-sectional view at the X-X position of FIG. 2A.
Figure 2C:
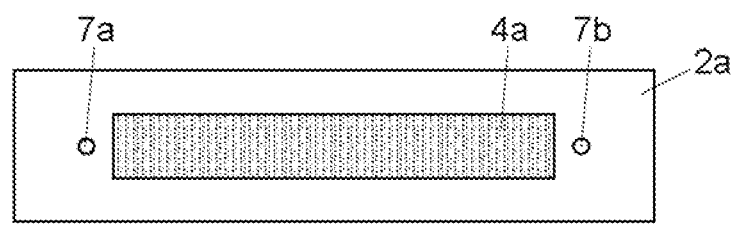
FIG. 2C is a bottom view of one substrate constituting the flowcell of the example.
Figure 2D:
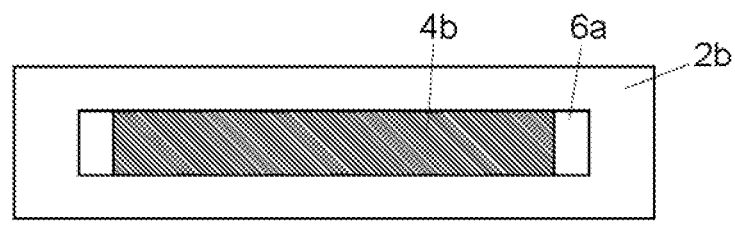
FIG. 2D is a plan view of the other substrate constituting the flowcell of the example.

FIGS. 2A to 2D are drawings for describing the flowcell 2 of the example, where FIG. 2A is a plan view thereof; FIG. 2B is a cross-sectional view at the X-X position of FIG. 2A; FIG. 2C is a bottom view of the substrate 2a; and FIG. 2D is a plan view of the substrate 2b.

The flowcell 2 is formed by directly bonding the insulating substrates 2a and 2b. The method of bonding the two substrates 2a and 2b is a tenacious bonding method such as anodic bonding or hydrofluoric acid bonding. The channel 6 is formed at the bonding surface between the two substrates 2a and 2b.

A pasty carbon material patterned into a shape positioned within the channel 6 is formed on a flat surface of the substrate 2a that faces the substrate 2b, and the material is sintered to form the carbon electrode 4a. The carbon electrode 4a is drawn out to the outside by a leading wire 16a that is buried in a through-hole 15a disposed in the substrate 2a, and is connected to the power supply apparatus 14. The through-hole 15a can be formed, for example, by etching or sand-blasting.

In the substrate 2a, a through-hole 7a that will be a liquid introducing inlet for introducing the liquid to the upstream end of the channel 6 and a through-hole 7b that will be a liquid discharging outlet for discharging the liquid from the downstream end of the channel 6 are formed.

A groove 6a that constitutes the channel 6 together with the opposing surface of the substrate 2a is formed in a surface of the substrate 2b that faces the substrate 2a. The metal electrode 4b is formed on a bottom surface of the groove 6a. The depth of the groove 6a is about 100 to 500 μm. The opposing electrode 4b is formed, for example, by vapor deposition or sputtering of a metal film made of platinum, gold, aluminum, tungsten, copper, silver, conductor silicon, titanium, chromium, or the like via a mask. The opposing electrode 4b is drawn out to the outside by a leading wire 16b that is buried in a through-hole 15b disposed in the substrate 2b, and is connected to the power supply apparatus 14. The through-hole 15b can also be formed, for example, by etching or sand-blasting.

The substrate 2a needs to be a heat-resisting substrate because the carbon electrode made of a pyropolymer is formed by sintering. As such a substrate, a glass substrate made of quartz glass, pyrex or the like, a silicon substrate, or the like can be used. The substrate 2b is a substrate that can form a groove that will be a channel, and can form a metal thin film. As the substrate 2b, a resin substrate can also be used besides a glass substrate made of quartz glass, pyrex or the like, or a silicon substrate similar to that of the substrate 2a.

As a method for forming a groove in the substrate 2b, dry etching or wet etching can be used when the substrate is a glass substrate or a silicon substrate, and molding, embossing, or the like can be used when the substrate is a resin substrate.

The method of bonding the substrates 2a and 2b is tenacious direct bonding, and a method that accords to the material of the substrates 2a and 2b can be used. For example, in the case of bonding between quartz glass substrates, hydrofluoric acid bonding can be used. In the case of bonding between silicon substrates, hydrofluoric acid bonding after forming a silicon oxide film on a silicon substrate surface can be used. In the case of bonding between a glass substrate and a silicon substrate, anodic bonding can be used. In the case in which the substrate 2b is a resin substrate, fusion or welding can be used.

One example of a method for forming a carbon electrode 4a using a photolithography technique will be described in the order of steps.

1. After a surface of a substrate 2a is cleaned, a photosensitive resist material is applied as a carbon material onto the surface of the substrate 2a by spin coating. The resist material may be, for example, SU-8 2010 or SU-8 3050 (both are products of Kayaku Microchem), AZ4620 (a product of AZ Electronic Materials Co., Ltd.), or the like.

2. Exposure to light is carried out using, as a mask, a photomask in which a predetermined pattern is formed with use of an aligner.

3. By a developing process, a resist pattern made of a resist material patterned into a predetermined pattern is formed on the substrate 2a.

4. The resist pattern formed on the substrate 2a is subjected to a sintering process at a temperature of 700 to 1100° C. in an atmosphere that does not contain oxygen, for example, in nitrogen. Specifically, the sintering process is carried out, for example, by setting the maximum temperature to be 1000° C., the temperature rise rate to be 2.0° C./min, the temperature drop rate to be 2.0° C./min and keeping the temperature at 1000° C. for 2 hours. The thickness of the resist layer before sintering was 8.0 to 12.0 and the thickness when turned into a pyropolymer after sintering was 1.4 to 2.2 μm.

In this example, a photosensitive resist material is used as the carbon material; however, a carbon material that is not photosensitive can be used as well. In the case of using a carbon material that is not photosensitive, a patterning method by stamping, for example, can be used in place of the patterning method using a photolithography technique.

Figure 3:
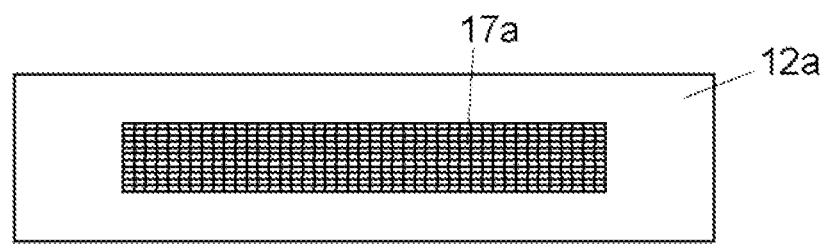
FIG. 3 is a bottom view of one substrate for describing another example of a flowcell.

The patterning method using a photolithography technique can pattern the resist material into a fine shape, and can form a carbon electrode having a fine structure. For example, in the example of FIG. 3, a carbon electrode 17a having a lattice shape with an aperture ratio of about 50% is formed on a substrate 12a in place of the carbon electrode 4a. By forming such a shape, the appearance of the inside of the flowcell 2 can be observed by eye inspection from the surface opposite to the surface on which the carbon electrode 17a of the substrate 12a is formed, whereby it is possible to quickly cope with problems such as generation of air bubbles in the channel 6 inside the flowcell 2. Here, the shape of the carbon electrode 17a may be a shape other than the lattice shape shown in FIG. 3, and may be a shape such that the inside of the channel 6 can be observed by eye inspection.

Figure 4A:
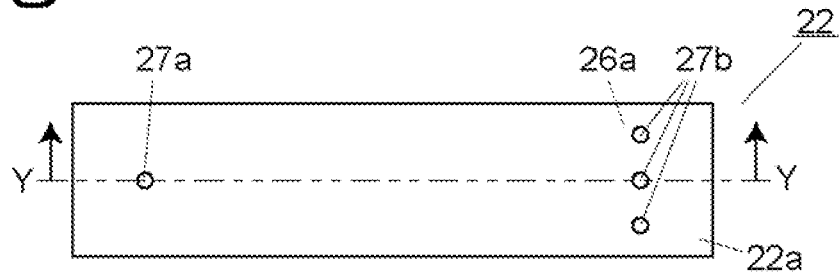
FIG. 4A is a plan view illustrating still another example of a flowcell.
Figure 4B:
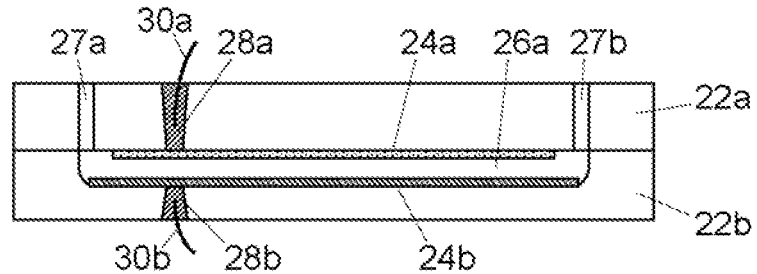
FIG. 4B is a cross-sectional view at the Y-Y position of FIG. 4A.
Figure 4C:
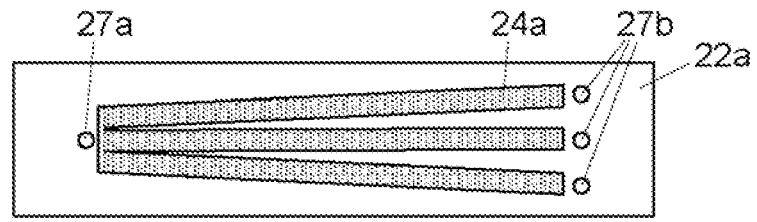
FIG. 4C is a bottom view of one substrate constituting the flowcell of the example.
Figure 4D:
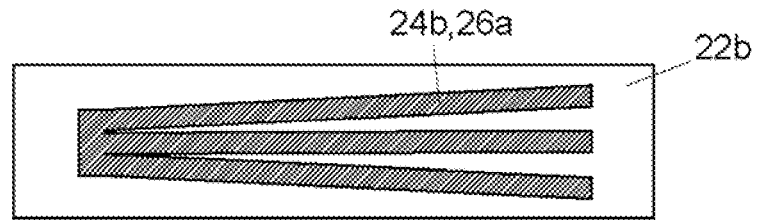
FIG. 4D is a plan view of the other substrate constituting the flowcell of the example.

Also, as shown, for example, in FIGS. 4A to 4D, a flowcell 22 can be constructed in such a manner that the liquid that has collected the $^{18}F^{-}$ ion can be distributed to a plurality. FIG. 4A is a plan view of the flowcell 22 of that example; FIG. 4B is a cross-sectional view at the Y-Y position of FIG. 4A; FIG. 4C is a bottom view of the substrate 22a; and FIG. 4D is a plan view of the substrate 22b. In this example, a groove 26a formed in the substrate 22b is branched in three directions from the upstream side to the downstream side, and a metal electrode 24b is formed at the bottom part of the groove 26a. The carbon electrode 24a on the surface of the substrate 22a is formed to correspond to the shape of the groove 26a of the substrate 22b. In the substrate 22a, three through-holes 27b are formed at three positions located at the downstream end of the channel 26. By adopting such a construction, the liquid that has collected the $^{18}F^{-}$ ion can be analyzed by being divided into a plurality of reactors or microreactors that are provided with different kinds of reagents.

In this example, the carbon electrode 24a is drawn out to the outside by a leading wire 30a that is buried in a through-hole 28a disposed in the substrate 22a, and is connected to the power supply apparatus 14. The opposing electrode 24b is drawn out to the outside by a leading wire 30b that is buried in a through-hole 28b disposed in the substrate 22b, and is connected to the power supply apparatus 14. The through-holes 28a and 28b can be formed by a method such as etching or sand-blasting.

An operation procedure for concentrating the $^{18}F^{-}$ ion will be described with reference to FIG. 1 and FIGS. 2A to 2D.

(1) With use of a temperature adjusting unit 11, the temperature of the flowcell 2 is adjusted to a predetermined temperature, and a voltage is applied between the electrodes 4a and 4b by a power supply apparatus 14 so that the carbon electrode 4a will be a positive electrode. A solution containing an $^{18}F^{-}$ ion is introduced from the liquid introducing inlet 7a of the flowcell 2 into the channel 6. Since the $^{18}F^{-}$ ion in the introduced liquid has a negative polarity, the $^{18}F^{-}$ ion is attracted to the carbon electrode 4a which is a positive electrode, so as to be trapped.

Here, in this step, the $^{18}F^{-}$ ion may be trapped while the solution containing the $^{18}F^{-}$ ion is being let to flow, or alternatively the $^{18}F^{-}$ ion may be trapped after attaining a state in which the inside of the channel 6 is filled with a solution containing the $^{18}F^{-}$ ion for a certain period of time.

(2) The inside of the channel 6 is filled with an $^{18}F^{-}$ ion collecting agent, and the voltage between the electrodes 4a and 4b is inverted so as to make the carbon electrode 4a a negative electrode. By this process, the $^{18}F^{-}$ ion trapped by the carbon electrode 4a is eliminated from the carbon electrode 4a, and is collected into the $^{18}F^{-}$ ion collecting agent.

As a collecting agent for the $^{18}F^{-}$, an acetonitrile solution of an organic reaction substrate and Kryptofix 222 (registered trade mark, product of Merck Co., Ltd.) can be used, for example.

(3) The $^{18}F^{-}$ ion collecting agent that has collected the $^{18}F^{-}$ ion is discharged from the sample discharging outlet 7b to the drain, so as to be collected.

(4) Acetonitrile is introduced into the channel 6 as a cleaning liquid, so as to clean the inside of the flowcell 2. This operation may be carried out for plural times.

Table 1 shows a measurement result of the trapping rate and the collecting rate of the $^{18}F^{-}$ ion when carbon electrodes made from different source materials and sintered under the same condition are used. In this measurement, one obtained by patterning three kinds of source material resists into a rectangular shape of 4 mm×4 mm and sintering the patterned resists under a condition with the maximum temperature being 1000° C., the temperature rise rate being 2.0° C./min, the temperature drop rate being 2.0° C./min, and the sintering time at the maximum temperature of 1000° C. being 2 hours was used as the carbon electrode 4a. The distance between the carbon electrode 4a and the opposing electrode 4b is 100 μm. A voltage of 10 V was applied between the electrodes 4a and 4b, and the $^{18}F^{-}$ ion was trapped to the carbon electrode 4a while an [$^{18}O$]—$H_2O$ aqueous solution containing the $^{18}F^{-}$ ion was being supplied at a flow rate of 500 μL/min. Thereafter, the inside of the flowcell 2 was filled with about 20 μL of acetonitrile containing Kryptofix 222 as an $^{18}F^{-}$ ion collecting agent, and a voltage of 3.3 V with a polarity inverted from that at the time of trapping the $^{18}F^{-}$ ion was applied for 60 seconds between the electrodes 4a and 4b, so as to collect the $^{18}F^{-}$ ion into acetonitrile.

Here, the [$^{18}F^{-}$ ion trapping rate] and the [$^{18}F^{-}$ ion collecting rate] were calculated using the following formulas.

$^{18}F^{-}$ ion trapping rate=(activity of the $^{18}F^{-}$ ion trapped by the cell)/(activity of the $^{18}F^{-}$ ion supplied to the cell)

$^{18}F^{-}$ ion collecting rate=(activity of the $^{18}F^{-}$ ion collected from the cell)/(activity of the $^{18}F^{-}$ ion trapped by the cell)

TABLE 1

| Source material resist | $^{18}F^{-}$ ion trapping rate (%) | $^{18}F^{-}$ ion collecting rate (%) |
|---|---|---|
| SU-8 2010 | 69.1 | 39.1 |
| SU-8 3050 | 66.3 | 38.1 |
| AZ4620 | 77.3 | 38.2 |

As shown in Table 1, it will be understood that a constant $^{18}F^{-}$ ion trapping rate and collecting rate can be obtained by the carbon electrode obtained by sintering any of the source material resists. When the distance between the electrodes 4a and 4b is shortened, the $^{18}F^-$ ion trapping rate and collecting rate can be further enhanced.

Also, in the example, a combination of a carbon electrode and a metal electrode was used; however, a construction in which both are carbon electrodes may be adopted as well.

INDUSTRIAL APPLICABILITY

The present invention can be used for a method in which an $^{18}F^-$ ion obtained by radiating a proton accelerated by a cyclotron to $[^{18}O]$—$H_2O$ water is separated from the $[^{18}O]$—$H_2O$ water so as to produce an organic solvent solution of the $^{18}F^-$ ion.

What is claimed is:

1. A flowcell for concentrating radioactive fluoride anion comprising:
    a cell main body in which a pair of insulating substrates are directly bonded to each other to form a channel in the inside thereof such that said channel is surrounded by said insulating substrates on all sides; and
    a pair of electrodes that are disposed in parallel with each other so as to oppose each other in the channel and firmly fixed onto each of the substrates, with at least one of the electrodes being a carbon electrode made of a pyropolymer,
    wherein the channel is formed by a flat surface of one substrate of the pair of insulating substrates and a groove formed in the other substrate, and the carbon electrode is formed on the flat surface, and the electrode opposed to the carbon electrode is formed within the groove.

2. The flowcell according to claim 1, wherein the interval between the pair of electrodes is 500 μm or less.

3. The flowcell according to claim 1, wherein the electrode opposed to the carbon electrode is a metal electrode having a flat and smooth surface.

4. The flowcell according to claim 1, wherein the substrate on which the carbon electrode is formed is a transparent substrate, and the carbon electrode has such an aperture ratio that the inside of the channel can be observed by a naked eye.

5. The flowcell according to claim 4, wherein the carbon electrode is formed in a lattice form.

6. An apparatus for concentrating radioactive fluoride anion comprising:
    the flowcell according to claim 1;
    a power supply that can apply a direct-current voltage between the pair of electrodes of the flowcell and can the polarity thereof;
    means for feeding an $[^{18}O]$—$H_2O$ aqueous solution containing an $^{18}F^-$ ion to the channel of the flowcell in the state of the carbon electrode being positive to trap the $^{18}F^-$ ion onto the carbon electrode from the $[^{18}O]$—$H_2O$ aqueous solution; and
    means for feeding an $^{18}F^-$ ion collecting agent to the channel of the flowcell in the state of the carbon electrode being negative to collect the $^{18}F^-$ ion, which has been trapped onto the carbon electrode, into the $^{18}F^-$ ion collecting agent.

* * * * *